United States Patent [19]

Källander et al.

[11] Patent Number: 5,603,080
[45] Date of Patent: Feb. 11, 1997

[54] RADIO COVERAGE IN CLOSED ENVIRONMENTS

[75] Inventors: Stefan E. P. Källander, Lidingö, Sweden; Philippe Charas, Amsterdam, Netherlands

[73] Assignee: Telefonaktiebolaget LM Ericsson, Stockholm, Sweden

[21] Appl. No.: 256,728

[22] PCT Filed: Nov. 19, 1993

[86] PCT No.: PCT/SE93/00992

§ 371 Date: Oct. 13, 1994

§ 102(e) Date: Oct. 13, 1994

[87] PCT Pub. No.: WO94/13067

PCT Pub. Date: Jun. 9, 1994

Related U.S. Application Data

[63] Continuation-in-part of Ser. No. 979,909, Nov. 23, 1992, Pat. No. 5,404,570.

[51] Int. Cl.⁶ ............................. H04B 7/26; H04B 7/15
[52] U.S. Cl. ............................. 455/14; 455/15; 455/20; 455/33.2; 455/56.1
[58] Field of Search .......................... 455/14–16, 20–22, 455/33.2, 33.4, 56.1; 379/59, 60

[56] References Cited

U.S. PATENT DOCUMENTS

| | | |
|---|---|---|
| 3,750,020 | 7/1973 | Baba et al. . |
| 3,868,575 | 2/1975 | Narbaits-Jaureguy et al. . |
| 3,916,311 | 10/1975 | Martin et al. . |

(List continued on next page.)

FOREIGN PATENT DOCUMENTS

| | | |
|---|---|---|
| 0342858A3 | 11/1989 | European Pat. Off. . |
| 3621990A1 | 1/1987 | Germany . |
| 2160074 | 5/1977 | Japan . |
| 52-61902 | 5/1977 | Japan . |
| 0027540 | 3/1981 | Japan . |
| 2-79630A | 3/1990 | Japan . |
| 2160074 | 12/1985 | United Kingdom . |
| WO87/06082 | 10/1987 | WIPO . |

OTHER PUBLICATIONS

Patent Abstracts of Japan, vol. 16, No. 297 (E–1226), abstract of Japanese Patent Pub. No. JP, A, 4–79617, published on Mar. 13, 1992.

Patent Abstracts of Japan, vol. 7, No. 27 (E–156), abstract of Japanese Patent Pub. No. JP, A, 57–181238, published on Nov. 8, 1982.

International Search Report issued in connection with PCT International Application No. PCT/SE 93/00992 on Mar. 9, 1994.

*Primary Examiner*—Chi H. Pham
*Attorney, Agent, or Firm*— Burns, Doane, Swecker & Mathis, L.L.P.

[57] ABSTRACT

A repeater system in a communication system including a base station and a mobile unit provides a communications link between the base station and the mobile unit when the mobile unit is located in an environment that is substantially closed off to high radio frequency communication between the base station and the mobile unit. The repeater system has a first linear two-way frequency converter including a high frequency port for two-way coupling to the base station and a low frequency port for two-way coupling to a low frequency signal that is capable of distributing radio frequency power through the closed environment. The low frequency port is connected to a cable which propagates and receives low radio frequency power within the closed environment. The repeater system also includes a first antenna for wireless coupling to the cable, and a second linear two-way frequency converter having a low frequency port connected to the first antenna for two-way coupling to a low frequency signal and a high frequency port for two-way coupling to a signal that is compatible with the high radio frequency signal used by the communications system. A second antenna is connected to the high frequency port of the second linear two-way frequency converter for wireless coupling of the second linear two-way frequency converter to a nearby mobile unit.

17 Claims, 6 Drawing Sheets

U.S. PATENT DOCUMENTS

| | | |
|---|---|---|
| 3,979,674 | 9/1976 | Martin . |
| 4,476,574 | 10/1984 | Struven . |
| 4,677,687 | 6/1987 | Matsuo . |
| 4,718,108 | 1/1988 | Davidson et al. .......................... 455/17 |
| 4,742,514 | 5/1988 | Goode et al. . |
| 4,754,450 | 6/1988 | Lynk, Jr. et al. . |
| 4,777,652 | 10/1988 | Stolarczyk ............................ 455/14 X |
| 4,873,711 | 10/1989 | Roberts et al. . |
| 4,972,505 | 11/1990 | Isberg ...................................... 455/15 X |
| 5,010,583 | 4/1991 | Parken . |
| 5,018,165 | 5/1991 | Sohner et al. . |
| 5,047,762 | 9/1991 | Bruckert . |
| 5,058,201 | 10/1991 | Ishii et al. . |
| 5,187,803 | 2/1993 | Sohner et al. . |
| 5,187,806 | 2/1993 | Johnson et al. . |
| 5,278,989 | 1/1994 | Burke et al. . |
| 5,404,570 | 4/1995 | Charas et al. ............................ 455/22 |

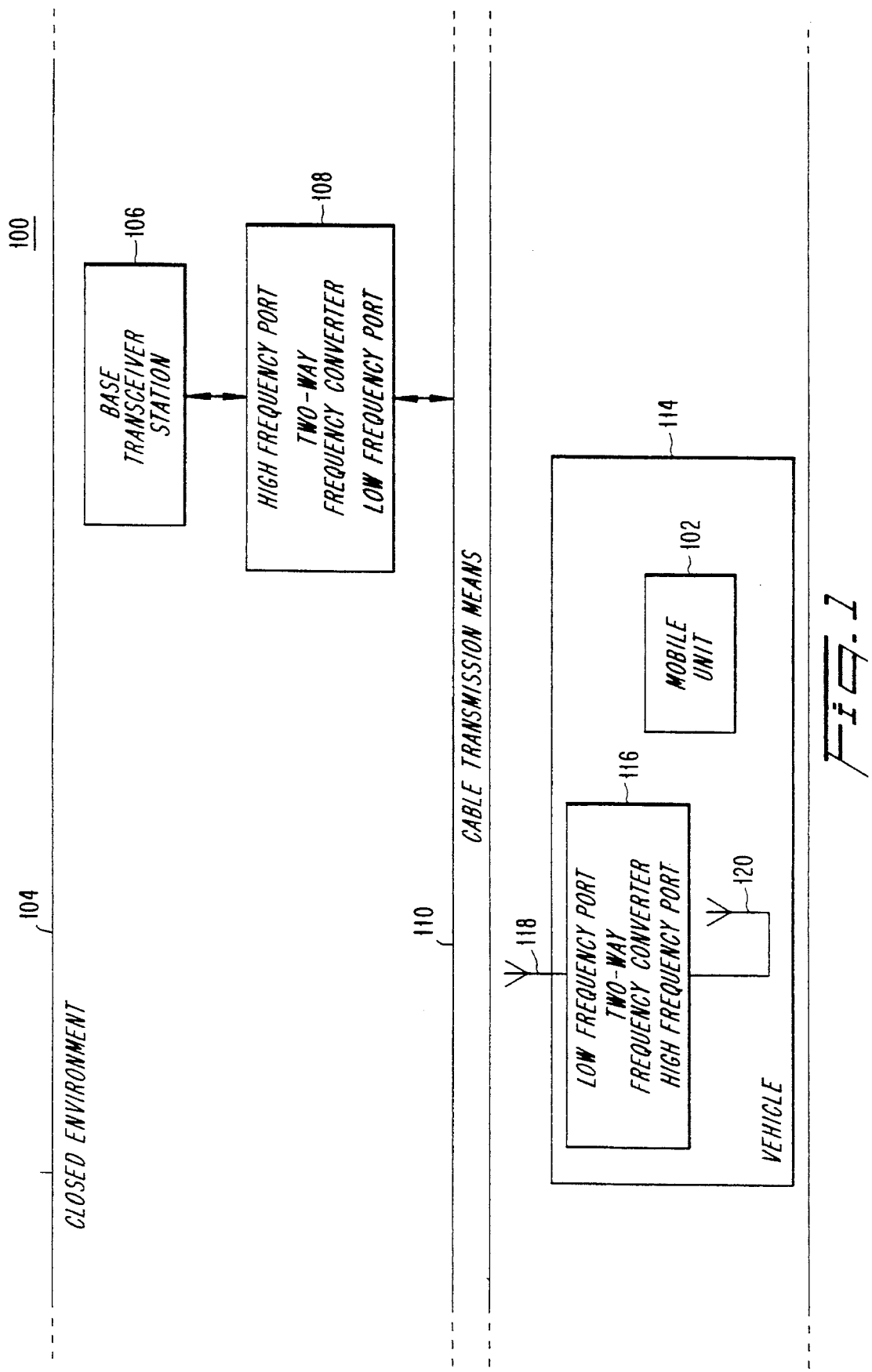

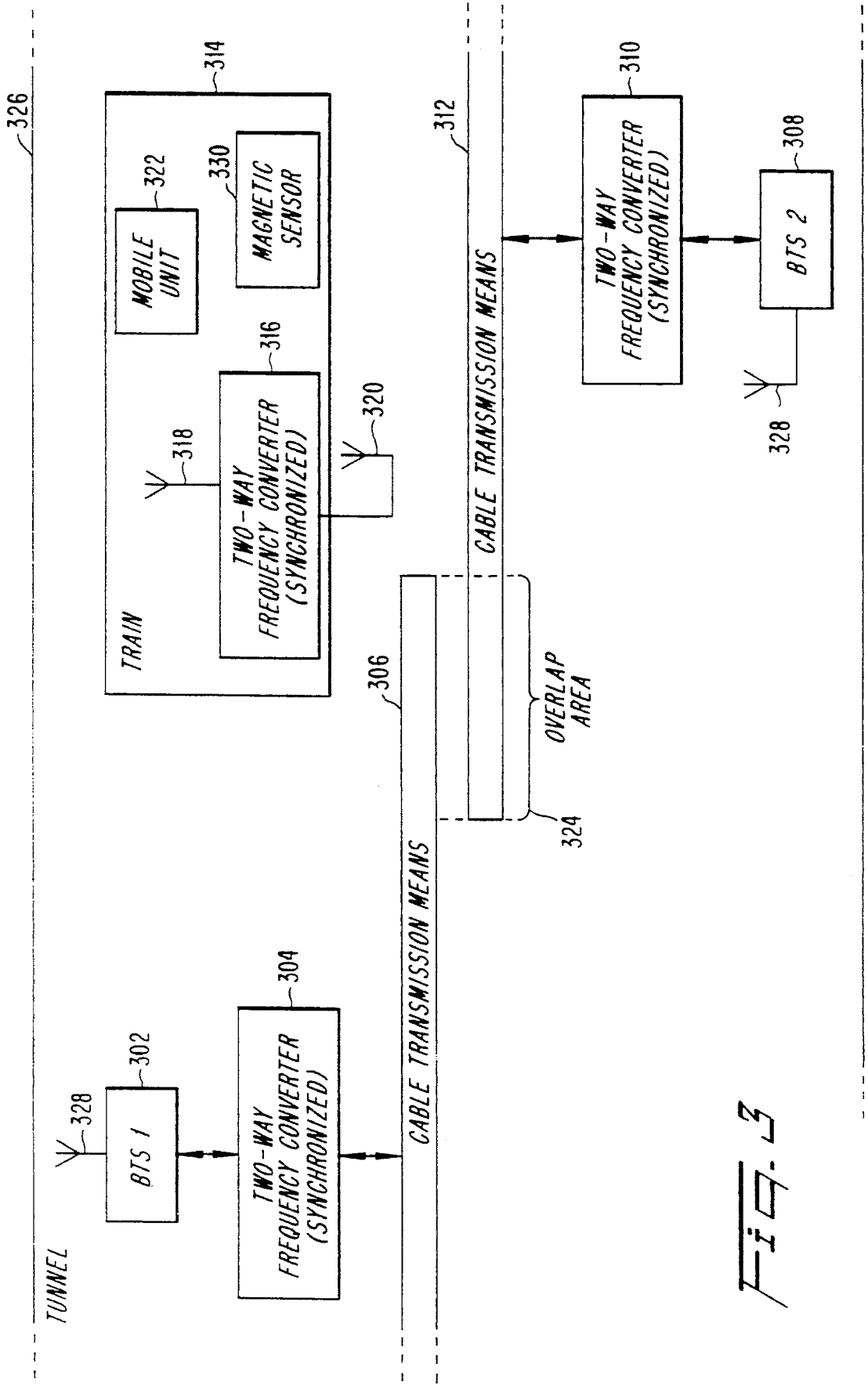

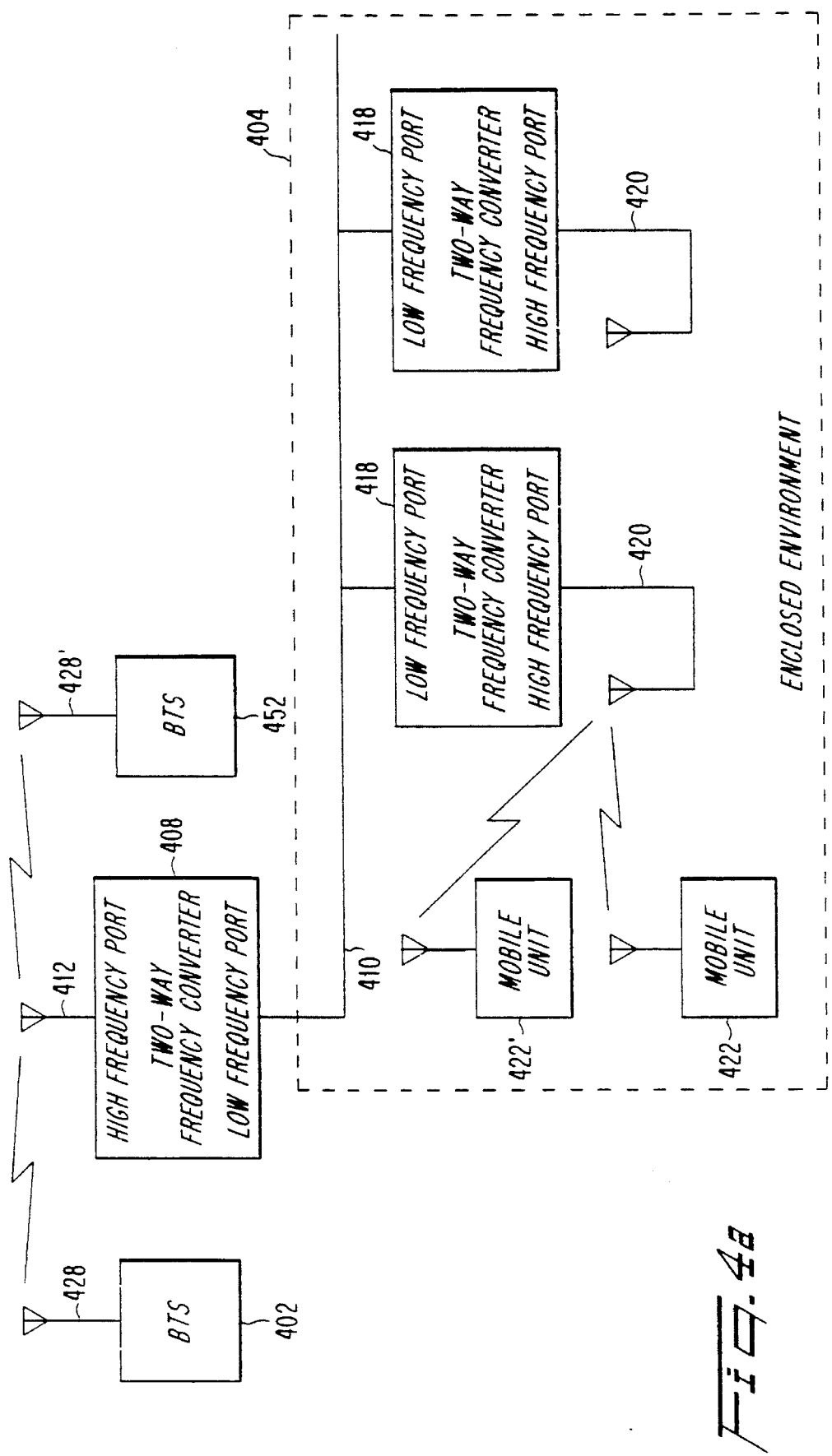

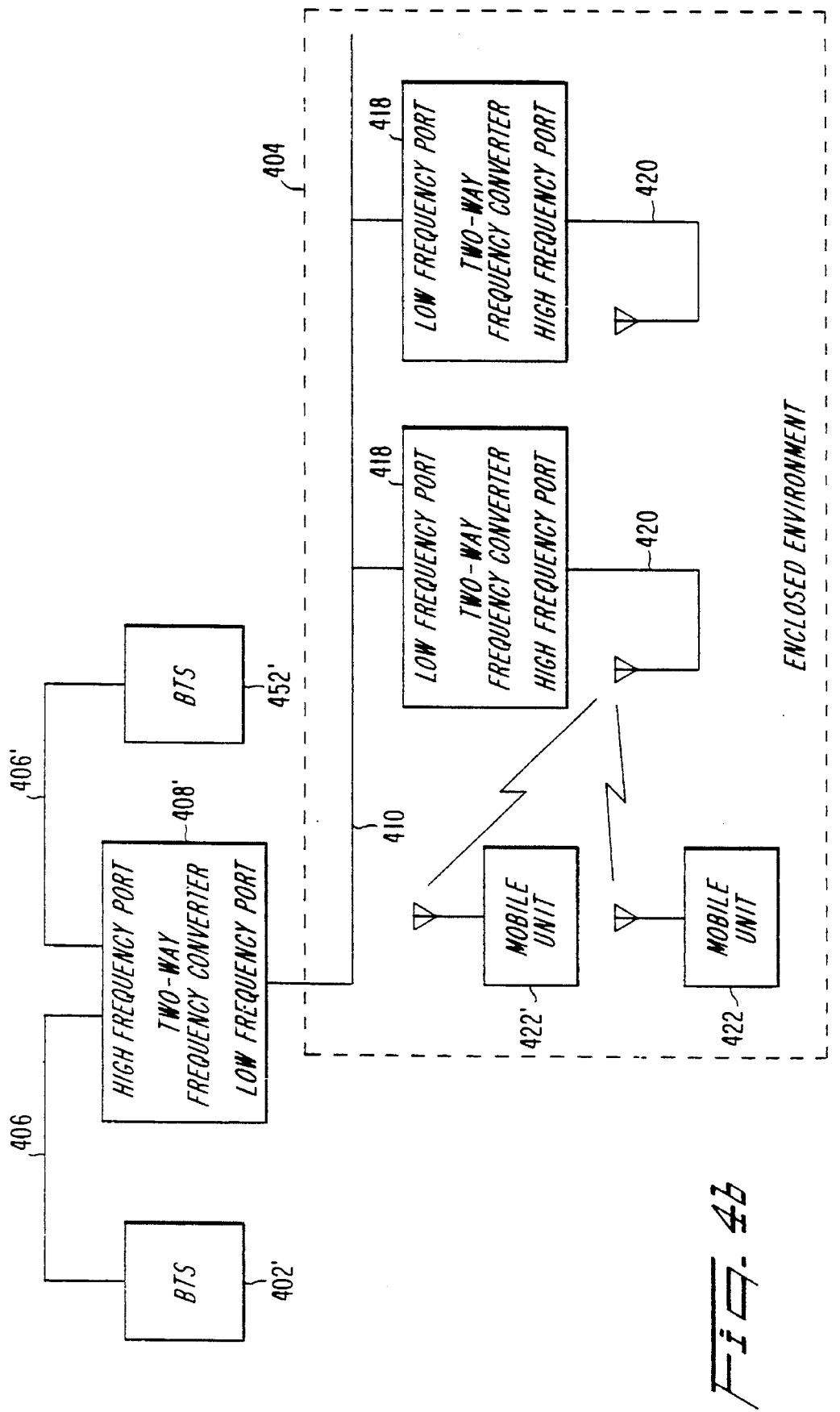

RADIO COVERAGE IN CLOSED ENVIRONMENTS

This application corresponds to International Application No. PCT/SE93/00992, filed Nov. 19, 1993, which designated the United States, and which in turns is a continuation-in-part of U.S. application Ser. No. 07/979,909, filed Nov. 23, 1992 now U.S. Pat. No. 5,404,570.

BACKGROUND OF THE INVENTION

1. Field of the Invention

The present invention relates to radio coverage in environments that are otherwise closed off to such coverage, and more particularly to cellular radio communications coverage in such closed off environments by means of repeaters, and even more particularly to a repeater system which converts communications system high radio frequency signals into low radio frequency signals for propagation in the closed off environment, and then back into high radio frequency signals.

2. Related Art

In a cellular telephone system, each portable telephone, referred to here as a mobile unit, is able to function only to the extent that it is able to send and receive radio signals to and from a base station associated with the system. However, in the real world environment there are impediments to normal radio communication. For example, at frequencies of approximately 1 GHz or higher, obstructions such as tunnels can attenuate the radio signal 50 dB/km up to total cut-off. The mount of attenuation will depend on circumstances such as the shape of the tunnel, and the presence of obstructions like trains. This attenuation makes the radio propagation environment erratic and unreliable.

Prior attempts to radiate radio frequency (RF) power into problematic isolated structures, referred to here as closed environments, include the use of leaky coaxial cable in the structure, and also the brute force approach of directing a large RF power level into the structure. However, such approaches have proven to be both expensive and prohibitively complicated.

SUMMARY OF THE INVENTION

It is therefore one object of the present invention to provide a simple and cost effective approach to providing radio coverage in closed environments.

Another object of the invention is to extend a cellular telephone architecture into a closed environment so that the closed environment is subdivided into several cells, and to provide for the hand off of frequencies between them as a mobile unit moves from one cell to another.

A further object of the invention is to offer a simple and cost effective solution which can be implemented as an "add-on kit" to present radio hardware without substantial change or extra cost to this hardware.

According to the present invention, the foregoing and other objects are attained in a repeater system for use in a communication system that includes a base station and a mobile unit, both operating at a high radio frequency. The repeater system provides a communications link between the base station and the mobile unit when the mobile unit is located in an environment that is substantially closed off to high radio frequency communication between the base station and the mobile unit. The repeater system comprises a first linear two-way frequency converter including a high frequency port for two-way coupling to the base station, and a low frequency port for two-way coupling to a low frequency signal that is capable of distributing frequency power through the closed environment. The repeater system also includes cable transmission means connected to the low frequency port of the first linear two-way frequency converter. The cable transmission means is located within the closed environment for radiating the low frequency converted signals within the closed environment. The repeater system also includes a first antenna for wireless coupling to the cable transmission means, and a second linear two-way frequency converter including a low frequency port connected to the first antenna for two-way coupling to a low frequency signal, and a high frequency port for two-way coupling to a signal that is compatible with the high radio frequency signal used by the communications system. The repeater system also has a second antenna connected to the high frequency port of the second linear two-way frequency converter.

With the above-described structure, a mobil unit in the vicinity of the second antenna can communicate with the base station in a normal fashion. The conversion of the high frequency signal into a low frequency signal and then back again into a high frequency signal is completely transparent to both the mobile unit and the base station.

In another embodiment of the above-described repeater system, the first antenna, second linear two-way frequency converter, and second antenna are located within a vehicle, and the cable transmission means is distributed along an anticipated path of the vehicle through the closed environment. As used throughout this specification, the term "vehicle" is used to represent a conveyance within which a mobile unit is to be able to operate. For example, the vehicle may be a train ear travelling through a tunnel as part of a subway system. In this example, a passenger on the train is able to use a mobil unit to communicate with the base station by means of the repeater system. This is because a train car so equipped becomes a mobile base station that services a moving cell that is defined by the confines of the train itself. A passenger on the train may use a mobile unit the same as he or she would outside of the subway system.

Besides providing normal communications service to a mobile unit located on a vehicle that is travelling within a closed environment, a further advantage of the described mobile base station is that the high radio frequency power level need only be strong enough to propagate through the train car (i.e., the moving cell). This keeps the total radiated power in the closed environment at a low level compared to the high level of output power that would be required to propagate the high radio frequency signal throughout the tunnel for direct reception by a mobile unit on a train. Other environmental benefits are achieved by not having to subject passengers and other equipment to high levels of radio wave energy. Instead, passengers are only subjected to the lower power signal transmitted by the second antenna on board the train.

Another feature of the repeater system is useful, for example, when a communication system has a base station located in each of adjacent subway stations. Here, the cable transmission means is associated with a first base station, and a terminal portion of the cable transmission means overlaps a corresponding terminal portion of a cable transmission means that is associated with a second base station. The region of overlap should be sufficient to permit the vehicle, in this case a train car, to simultaneously pass by the terminal portions of both cable transmission means for at least several seconds when the vehicle is travelling at a typical speed away from the first base station and toward the second base station. This avoids the problem of having all mobile units on board the train, travelling away from the first base station and toward the second base station, handed off from the first base station to the second base station at the same time.

Also, in the example of a mobil unit located on a moving vehicle, the above-described repeater system may further include a sensor coupled to the second linear two-way frequency converter for alternatively turning the second linear two-way frequency converter on and off in response to respectively sensing the vehicle entering and exiting the closed environment.

In another embodiment of the repeater system, the high radio frequency is in a range of 900 to 2000 megahertz, and the low frequency is in a range of 30 to 300 megahertz.

In yet another embodiment of the repeater system, the cable transmission means is a bifilar cable.

In still another embodiment of the repeater system, the cable transmission means comprises a coaxial cable connected to the first linear two-way frequency converter, an amplifier having an input connected to the coaxial cable, and a third antenna connected to an output of the amplifier.

In another embodiment of the repeater system, the first and second linear two-way frequency converters are synchronized to a system clock.

BRIEF DESCRIPTION OF THE DRAWINGS

FIG. 1 is a block diagram of one embodiment of the system in accordance with the present invention.

FIG. 3 is a block diagram showing another embodiment of the present invention.

FIGS. 4a–4c show alternative embodiments of another feature of the present invention which provides continuous mobile telecommunications service as a subscriber moves back and forth between open and enclosed environments.

DESCRIPTION OF THE PREFERRED EMBODIMENT

Figure 2A:
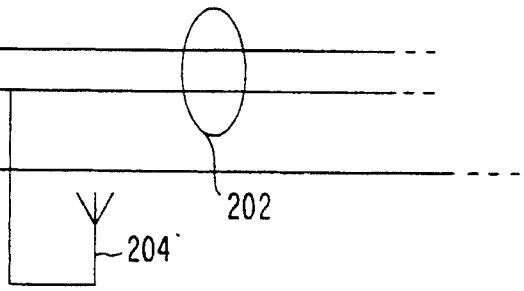
FIGS. 2a and 2b are more detailed block diagrams showing two preferred embodiments of the cable transmission means for use in the present invention.

The present invention provides radio coverage to closed environments by recognizing that the radio frequency environment consists of two pans; a first environment in which the radio signal is propagated up to, but not within, the closed environment; and a second environment consisting of the area located within the closed environment. Methods for propagating a radio signal in the first environment, which does not present the above-described signal obstruction problems, are well known to those of ordinary skill in the art, and need not be described here, Cellular telephone systems functioning in this first environment typically radiate RF power in the 900–2000 megahertz (MHz) range. Both the mobile units and the base stations of such a system are adapted to transmit and receive in this frequency range.

Propagation of the signal within the second, closed environment can be accomplished by propagating a low radio frequency signal, preferably in the range 30–300 MHz, through either a coaxial or a bifilar conductor located within the closed environment. However, it should be readily apparent that a typical mobile unit is not capable of operating in this frequency range, and cannot directly take advantage of such a signal.

Referring to FIG. 1, a preferred embodiment of a system 100 for enabling a mobile unit 102 to continue to operate within a closed environment 104 is shown. The system 100 includes a multi-channel Base Transceiver Station (BTS) 106 associated with a cellular telephone system (not shown). The BTS 106 operates on a frequency that is compatible with the cellular telephone system. For the purposes of this description, it will be presumed that the BTS 106 transmits and receives RF power in the 1500 MHz band with a 45 MHz duplex distance between uplink and downlink frequencies.

The closed environment 104 may be a tunnel that is part of a subway system. In such a case, a BTS 106 is preferably placed in each underground station, with BTS's 106 located at adjacent underground stations operating at different frequencies in accordance with frequency allocation requirements for ordinary cell planning.

In order to communicate with the mobile unit 102 located in the closed environment 104, the BTS 106 is connected to the high-frequency port of a first linear two-way frequency converter 108. The low frequency port of the first frequency converter 108 is connected to cable transmission means 110. The function of the first frequency converter 108 is to convert the 1500 MHz signal that is output by the BTS 106 into a low frequency RF signal which can be propagated into the closed environment 104 by means of the cable transmission means 110 which is distributed throughout the closed environment 104, preferably along an anticipated path of the vehicle 114 containing a mobile unit 102. For purposes of discussion, it will be assumed that this low frequency RF signal is 200 MHz.

The first frequency converter 108 also converts low frequency RF signals, which may be received from another source and propagated by the cable transmission means 110, into high frequency signals for reception by the BTS 106. Thus, in the illustrative example, a 200 MHz signal propagated by the cable transmission means 110 would be convened to a 1500 MHz signal for use by the BTS 106.

Figure 2B:
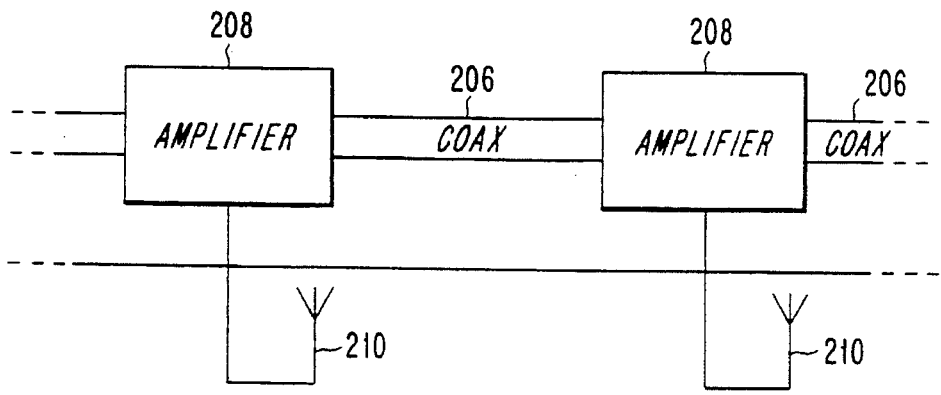

It has been mentioned that the function of the cable transmission means 110 is to propagate a low frequency RF signal throughout the closed environment 104. FIGS. 2a and 2b illustrate two different embodiments for accomplishing this. FIG. 2a shows the cable transmission means 110 implemented as a simple bifilar cable 202 connected to simple radiators 204, such as dipole antennas, that are located throughout the closed environment 104. Power from the low frequency RF signal is then radiated into the closed environment 104 through the simple radiators 204 as well as through the bifilar cable 202 itself. The same bifilar cable 202 may be used to propagate a low frequency RF signal that is received, as described below, within the closed environment 104, for reception by the low frequency port of the first frequency converter 108.

An alternative embodiment of the cable transmission means 110 is shown in FIG. 2b. Here, an inexpensive coaxial cable 206 distributes the low frequency RF signal to a series of simple low cost amplifiers 208, each connected to an antenna 210. The amplifier 208/antenna 210 combinations can be placed at every 100 m along the closed environment. Output power can be maintained at a very low level that is amplified by each successive amplifier 208. Each amplifier 208 should be capable of amplifying signals travelling in two directions, that is, into and out of the first frequency converter 108. The purpose of this two way signal propagation is to permit bidirectional communication between a mobile unit 102 and the BTS 106. This is described in greater detail below.

Another alternative embodiment of the cable transmission means 110 is to use two cables in parallel, each dedicated to propagating a signal in only one direction. For example, the cable transmission means 110 may be embodied by two bifilar cable 202/radiator 204 combinations which are both distributed along the same path in the closed environment 104. In this case, each bifilar cable 202 is dedicated to propagation of a low frequency RF signal in only one direction, either into or out of the first frequency converter 108.

Referring back to FIG. 1, the mobile unit 102 is located inside a vehicle 114, which may be a train car. Associated with the vehicle 114 is a second linear two-way frequency converter 116. The second frequency converter 116 is connected at its low frequency port to a fast antenna 118. The first antenna 118 is located on the outside of the vehicle 114 as close as possible to the radiating cable transmission means 110, to enable it to receive and transmit the low frequency RF signal.

The second frequency converter 116 is connected at its high frequency port to a second antenna 120, which transmits and receives the high RF signal inside the vehicle 114.

The first and second frequency converters 108, 116 are phase locked to the system clock so that their output frequencies will be synchronized to operate at fixed offsets from one another. This will generate a moving fading pattern for the mobile radio stations carried by the subscribers, as explained below.

With the configuration described above, each vehicle 114 is treated as an extended BTS cell, allowing hand held cellular telephones to be used in the ordinary way.

The above-described system 100, involving the use of frequency conversion, is preferably part of a digital communications system that utilizes a Frequency Division Multiple Access (FDMA), Time Division Multiple Access (TDMA), or Code Division Multiple Access (CDMA) method of transmission. However, it could also be used in an analog communications system.

Referring now to FIG. 3, an example is shown in which the vehicle 114 is one car in a train 314 in a subway system. A first BTS 302 is located at a first subway station, and a second BTS 308 is located at a second subway station that is adjacent the first. The first BTS 302 communicates with a mobile unit 322 located on the train 314 by propagating its low RF frequency signal along the first cable transmission means 306, which may preferably be either of the embodiments described above with respect to FIGS. 2a and 2b. As the train 314 moves away from the first station toward the second station, it will be necessary for the first BTS 302 to hand off the call to the second BTS 308. In order to prevent all mobile units 322 from making hand offs at the same time, terminal portions of the first and second cable transmission means 306, 3 12 should overlap one another. The mount of overlap 324 should be designed to permit the second antenna 320, mounted on the vehicle, to be near both the first and second cable transmission means 306, 312 for several seconds when the train 314 is travelling at a typical speed. For example, the system may be designed to permit the second antenna 320 to be near both the first and second cable transmission means 306 for about 5 seconds when the train 314 is travelling at a speed of 20 meters per second by allowing terminal portions of the first and second cable transmission means 306, 312 to overlap one another for a length of about 100 meters. This will allow the second antenna 320 to experience a gradual decrease in received power as it leaves the coverage area of the first BTS 302 while at the same time experiencing a gradual increase in received power as it approaches the coverage area of the second BTS 308.

In another feature of the present invention, the two-way frequency converter 316 located inside the train 314 is switched off when the train 314 leaves the tunnel 326 and comes under the coverage of another BTS cell that does not provide service to the closed environment (not shown). Similarly, the frequency converter 316 located inside the train 314 is switched on when the train 314 enters a tunnel 326. The switching on and off of the frequency converter 316 is activated by a magnetic sensor 330, or the like, in the train that senses the emerging entrance into and exit from the tunnel 326, and sends appropriate signals to the frequency converter 316.

It is important to note that when the train 314 leaves the tunnel 326, causing the two-way frequency converter 316 to be switched off, a mobile unit 322 in use at the time must quickly be handed off to an outside BTS cell that does not provide service to the closed environment (not shown). Thus, the outside BTS cell should provide good coverage to the area just outside the tunnel. To achieve this, an outside BTS cell may preferably be placed at the exit of the tunnel 326.

In another feature of the present invention, each BTS 302, 308 has a third antenna 328 which enables it to directly serve any mobile unit being operated at the subway station. Thus, a passenger who is utilizing a mobile unit 322 at a subway station may continue to be serviced by the same BTS 302, 308 as he or she moves from the station platform to the train 322. The same is true when a passenger who is using a mobile unit 322 leaves the train 322 and steps onto a station platform.

It is not always possible or desirable in a telecommunications system to have a base station located at a subway station for transmission to mobile units that are situated on the station platform or elsewhere within the station. This is true, as well, in many other enclosed environments, such as in metal skyscrapers, building elevators and basements, mines and culverts. Nonetheless, it is important for mobile telephone subscribers to be able to continue using their mobile units as they move, for example, from a location outside a train station to locations first within the station and then inside the train itself. Alternative embodiments of the present invention will now be described, with reference to FIGS. 4a–4c, which present solutions to this problem.

FIG. 4a is a block diagram of an enclosed environment 404 into which an alternative embodiment of the present invention has been installed. A base transceiver station 402, located outside of the enclosed environment 404, broadcasts and receives high frequency signals by means of a base station antenna 428. Such high frequency signals are normally received and transmitted by mobile units (not shown) which are located outside of the enclosed environment 404. In order to permit one or more mobile units 422, 422', which are located within the enclosed environment 404, to continue communicating with the base transceiver station 402, an outside antenna 412 is coupled to a high frequency port of a first two-way frequency converter 408. The outside antenna is disposed at a location which permits it to receive high frequency signals from, and transmit high frequency signals to one or more base station transceivers 402, 452. The low frequency port of the first two-way frequency converter 408 is coupled to cable transmission means 410 as described above with respect to other embodiments of the invention. This low frequency port transmits and/or receives signals in a frequency range suitable for transmission on the cable transmission means 410 within the enclosed environment 404.

The cable transmission means 410 is disposed within the enclosed environment so as to traverse areas in which mobile communications are to be provided. Connected to the cable transmission means 410, at various locations within the enclosed environment 404, are the low frequency ports of respective third two-way frequency converters 418. Each of the third two-way frequency converters 418 receives a low-frequency signal at its low-frequency port, and converts that signal into high-frequency signal which is made available at its high-frequency port. An antenna 420 is coupled to the high-frequency port of each third two-way frequency converter 418, so that a high frequency signal will be transmitted within the enclosed environment for reception by the mobile unit 422. The third two-way frequency converters 418, which are all connected to the same cable transmission means 410, are disposed within the enclosed environment 404 at locations such that as a subscriber using a mobile unit 422 begins to leave an area served by one of the third two-way frequency converters 418, he will simultaneously enter an area served by an adjacent third two-way frequency converter, so that no handoff is necessary.

Similarly when the mobile unit 422 transmits a high-frequency signal, this high-frequency signal is received by a nearby antenna 420 coupled to the high-frequency port of a corresponding third two-way frequency converter 418. The third frequency converter 418 converts this to a low-frequency signal that is suitable for transmission on the cable transmission means 410 which is coupled to the low-frequency port of that third two-way frequency converter 418. That signal is subsequently converted into a high frequency signal by the first two-way frequency converter 408. That high-frequency signal is then broadcast back to one of the corresponding base station transceivers 402, 452 by means of the antenna 410.

As mentioned above, the embodiment of the invention as depicted in FIG. 4a is useful for providing continuous mobile telecommunications service as a subscriber moves back and forth between open and enclosed environments. When the enclosed environment is, for example, a subway system, the embodiment shown in FIG. 4a may be combined with any of the previously described embodiments, so that a subscriber may receive continuous mobile telecommunications service not only upon entering and leaving the enclosed environment, such as happens when that subscriber walks from a street level location to a subway platform, but also when that subscriber leaves the subway platform by boarding a train. In such a situation, the platform may be equipped with third two-way frequency converters 418 in the manner depicted in FIG. 4a. Under these circumstances, the third two-way frequency converters 418 are coupled to the same cable transmission means which also provide the low-frequency signal that may be leaked or otherwise broadcast to the second frequency converter 116 which is located in the train. The frequency converters in the trains and the ones fixedly mounted on the platform should be controlled so that their transmitting frequencies are offset by a predetermined amount, such as 50–100 Hz from the synchronous converter frequency, in order to produce a moving fading pattern. This will prevent radio waves from cancelling one another at fixed locations at which a non-moving subscriber's ability to communicate would otherwise be hindered, while maintaining a contiguous cell created by the frequency converters 418.

When a subscriber who is talking by means of his mobile unit 422 enters or leaves a train, no handoff is required because the high frequency antennas of the converter in the train and on the platform handle the same signals associated with the same base transceiver station 402. The same is true when a subscriber who is walking through a corridor of the subway station leaves the vicinity of one fixedly mounted two-way frequency converter 418 and approaches another: no handoff is required because the two frequency converters are deriving signals from the same cable.

The arrangement of FIG. 4a, in which the first two-way frequency converter 408 receives high frequency signals from the base transceiver station 402 by means of a radio coupling has the advantage that a subsystem for closed environments is entirely freestanding, and may be installed in a closed environment in order to extend the service provided by several competing operators. Because it may be shared by these operators, the cost of this subsystem may be shared among operators. In this case, one or more additional base stations 452, as well as the base station 402, communicate via radio with the first frequency converter 408, whereby the air-interface is such that the first frequency converter 408 emulates the mobile stations hidden by the closed environment to this direct radio path. Each of the base stations 402, 452 may use different frequency bands, such as in the case of base stations belonging to competing operators. For example, one base station 402 may use the "A" band of the AMPS standard, and the other base station 452 may use the "B" band of that standard. Alternatively, if the two neighboring base stations 402, 452 belong to the same operator, the same frequency band may be used with the control and traffic channels of respective base stations using different frequencies according to the frequency plan of the cellular system.

The radio path as shown in FIG. 4a between the base stations 402, 452 and the first frequency converter 408 may also be used in the embodiments of FIGS. 1 and 3, between the BTS 106 and the first frequency converter 108, as well as between the BTS 302 and the first frequency converter 304.

However, an alternative embodiment is depicted in FIG. 4b which may also be used in appropriate situations. The block diagram of FIG. 4b is identical to that of FIG. 4a, except that base transceiver stations 402', 452' and a high frequency port of the first two-way frequency converter 408' are directly coupled via respective coupling means 406, 406', rather than being coupled by a radio link. Except for this difference, the operation of the system shown in FIG. 4b is identical to that described above with respect to FIG. 4a.

Figure 4C:
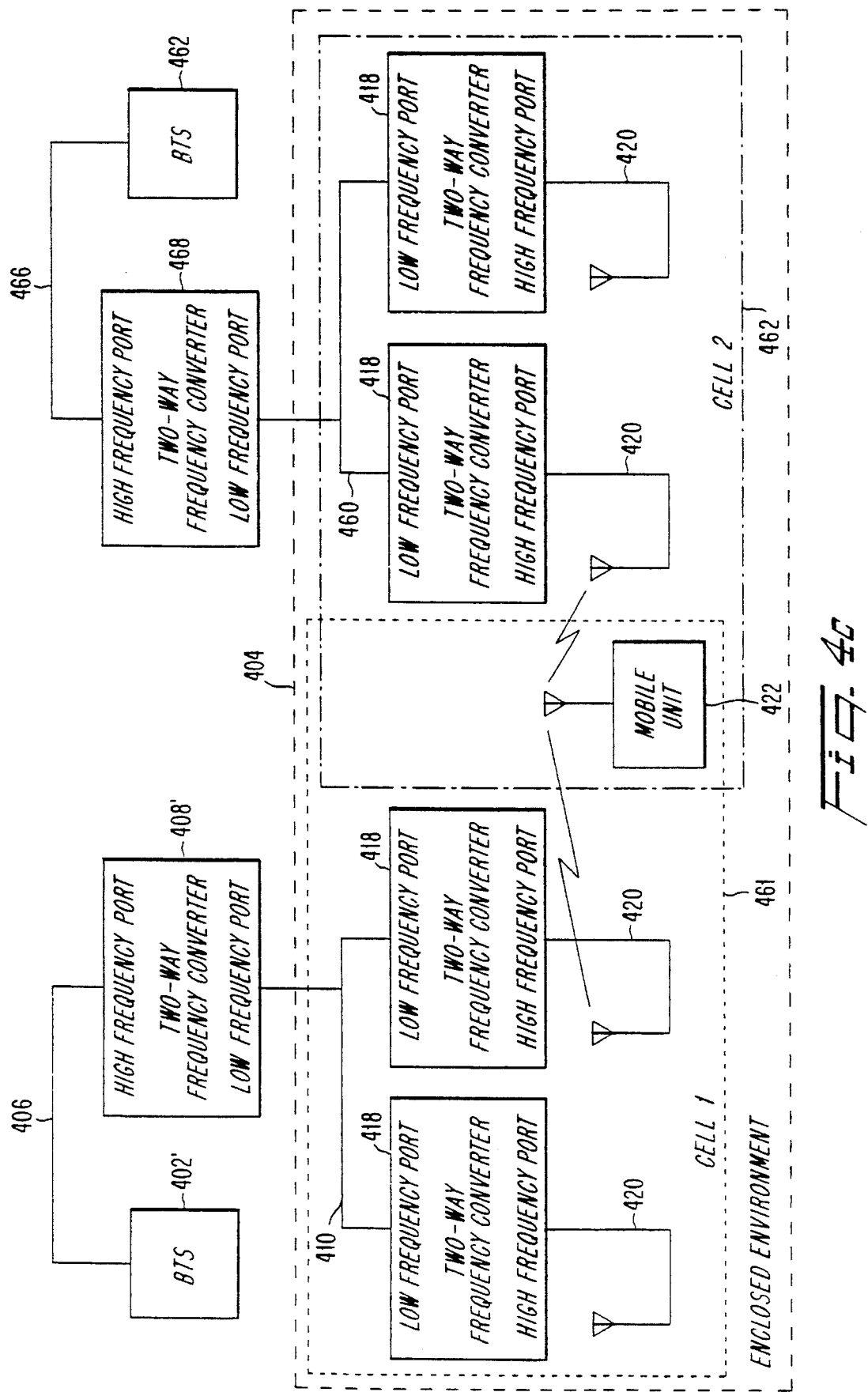

The alternative embodiments described with reference to FIGS. 4a and 4b may be arranged to provide additional advantages. One exemplary embodiment of such an arrangement is shown in FIG. 4c. In FIG. 4c, two systems of the type depicted in FIG. 4b are both installed within one enclosed environment 404. In a first system, a base transceiver station 402' is directly coupled to a high frequency port of the first two-way frequency converter 408' by the coupling means 406. It will be recognized, however, that an air-interface such as the one shown in FIG. 4a may alternatively be used. The low frequency port of the first two-way frequency converter 408' is coupled to the cable transmission means 410, which in turn is coupled to the two-way frequency converters 418 exactly as described above with reference to FIG. 4b. The arrangement of these synchronous frequency converters 418 effectively forms a first cell 461, such that no handoff is required so long as the mobile unit 422 is located within the service area of one of the corresponding antennas 420.

A second system, comprising the base transceiver station 462, coupling means 466, first two-way frequency converter 468, cable transmission means 460, and third two-way frequency converters 418 coupled to corresponding antennas 420 is similarly arranged within the enclosed environment to form a second cell 462.

Each of the first and second cells 461,462 can, for example, be a cellular TDMA, CDMA, or analog cell.

The antennas 420 of the first and second cells 461,462 may be disposed to create an area of overlap, so that when a subscriber who is using his mobile unit 422 is about to leave, for example, the first cell 461, he will at the same time start to enter a region that is also served by the second cell 462. This will be detected, and a handoff of the call from the first cell 461 to the second cell 462 can be effected in accordance with principles that are well known to those of ordinary skill in the art. Thus, this embodiment of the present invention permits a plurality of cells to be formed within one enclosed environment.

The invention has been described with reference to particular embodiment. However, it will be readily apparent to those skilled in the art that it is possible to embody the invention in specific forms other than those of the preferred embodiment described above. This may be done without departing from the spirit of the invention. For example, if only one-way communication is required, then the two linear frequency converters need only be capable of convening signals in one direction. Also, the inventive concepts are not limited to application in subway systems, but are equally applicable to other situations where it is advantageous to provide mobile subscribers with a means for continuing normal operation of their mobile units as they leave open environments and enter enclosed environments, such as metal skyscrapers, building elevators and basements, mines and culverts.

The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a communication system including at least one base station and at least one mobile unit, both operating at a high radio frequency, a repeater system for providing a communications link between the base station and the mobile unit when the mobile unit is located in an environment that is substantially closed off to high radio frequency communication between the base station and the mobile unit, the repeater system comprising:

a first linear two-way frequency converter including:
      a high frequency port for two-way coupling to a base station; and
      a low frequency port for two-way coupling to a low frequency signal for radiating radio frequency power through the closed environment;
   cable transmission means connected to the low frequency port of the first linear two-way frequency converter, and located within the closed environment for radiating and receiving the low frequency signal within the closed environment;
   a first antenna for wireless coupling to the cable transmission means;
   a second linear two-way frequency converter including:
      a low frequency port connected to the first antenna for two-way coupling to a low frequency signal;
      a high frequency port for two-way coupling to a signal that is compatible with the high radio frequency signal used by the communications system; and
   a second antenna connected to the high frequency port of the second linear two-way frequency converter; and
   a third linear two-way frequency converter, located within the closed environment, including:
      a low frequency port connected to the cable transmission means for two-way coupling to the low frequency signal; and
      a high frequency port for two-way coupling to the signal that is compatible with the high radio frequency signal used by the communication system; and
   a third antenna connected to the high frequency port of the third linear two-way frequency converter.

2. The repeater system of claim 1, wherein the closed environment is a subway station.

3. The repeater system of claim 1, wherein the closed environment is a building.

4. The repeater system of claim 1, wherein the closed environment is a mine.

5. The repeater system of claim 1, wherein the closed environment is a culvert.

6. The repeater system of claim 1, wherein the first antenna, second linear two-way frequency converter, and second antenna are disposed on a vehicle, and placement of the cable transmission means within the closed environment includes distribution along an anticipated path of the vehicle through the closed environment.

7. The repeater system of claim 1, further comprising:
   a fourth linear two-way frequency converter, located within the closed environment, including:
      a low frequency port connected to the cable transmission means for two-way coupling to the low frequency signal; and
      a high frequency port for two-way coupling to the signal that is compatible with the high radio frequency signal used by the communication system; and
   a fourth antenna connected to the high frequency port of the fourth linear two-way frequency converter,
   wherein the fourth linear two-way frequency converter operates at a frequency that is synchronized to have a fixed offset from a frequency being used by the third linear two-way frequency converter,
   and wherein the third and fourth antennas are disposed within the enclosed environment so as to form a first contiguous cell within the enclosed environment.

8. The repeater system of claim 6, wherein placement of the cable transmission means within the closed environment further includes distribution in locations where the mobile unit is expected to be carried.

9. The repeater system of claim 6, wherein the closed environment is a building, and wherein the vehicle is an elevator in the building.

10. The repeater system of claim 6, wherein the closed environment is a subway system comprising station platforms interconnected by train tunnels, and wherein the vehicle is a train car in the subway system.

11. The repeater system of claim 6, wherein the second and third linear two-way frequency converters each have a respective transmitting frequency and a respective synchronous converter frequency, and wherein further the second and third linear two-way frequency converters are controlled to cause their respective transmitting frequencies to be offset by a predetermined amount from their respective synchronous converter frequencies, thereby producing a moving fading pattern.

12. The repeater system of claim 10, wherein signals carried by the cable transmission means are associated with a first base station, and wherein a terminal portion of the cable transmission means overlaps a corresponding terminal portion of a cable transmission means that is associated with a second base station, the region of overlap being sufficient to permit the vehicle to simultaneously pass by the terminal portions of both cable transmission means for at least several seconds when the vehicle is travelling at a predetermined speed away from the cable transmission means associated with the first base station, and toward the cable transmission means associated with the second base station, in order to permit a handoff of service from the first base station to the second base station.

13. In a communication system including at least one base station and at least one mobile unit, both operating at a high radio frequency, a repeater system for providing a communications link between the base station and the mobile unit when the mobile unit is located in an environment that is substantially closed off to high radio frequency communication between the base station and the mobile unit, the repeater system comprising:
  a first linear two-way frequency converter including:
    a high frequency port for two-way coupling to a base station; and
    a low frequency port for two-way coupling to a low frequency signal for radiating radio frequency power through the closed environment;
  cable transmission means connected to the low frequency port of the first linear two-way frequency converter, and located within the closed environment for radiating and receiving the low frequency signal within the closed environment;
  a first antenna for wireless coupling to the cable transmission means;
  a second linear two-way frequency converter including:
    a low frequency port connected to the first antenna for two-way coupling to a low frequency signal;
    a high frequency port for two-way coupling to a signal that is compatible with the high radio frequency signal used by the communications system; and
  a second antenna connected to the high frequency port of the second linear two-way frequency converter; and
  a third antenna, connected to the high frequency port of the first linear two-way frequency converter, for wireless coupling to the at least one base station.

14. In a communication system including at least one base station and at least one mobile unit, both operating at a high radio frequency, a repeater system for providing a communications link between the base station and the mobile unit when the mobile unit is located in an environment that is substantially closed off to high radio frequency communication between the base station and the mobile unit, the repeater system comprising:
  a first linear two-way frequency converter including:
    a high frequency port for two-way coupling to a base station; and
    a low frequency port for two-way coupling to a low frequency signal for radiating radio frequency power through the closed environment;
  cable transmission means connected to the low frequency port of the first linear two-way frequency converter, and located within the closed environment for radiating and receiving the low frequency signal within the closed environment;
  a first antenna for wireless coupling to the cable transmission means;
  a second linear two-way frequency converter including:
    a low frequency port connected to the first antenna for two-way coupling to a low frequency signal;
    a high frequency port for two-way coupling to a signal that is compatible with the high radio frequency signal used by the communications system; and
  a second antenna connected to the high frequency port of the second linear two-way frequency converter; and
  second cable transmission means, coupled to the high frequency port of the first linear two-way frequency converter, for coupling to the at least one base station.

15. In a communication system including a base station and a mobile unit, both operating at a high radio frequency, a method for communicating between the base station and the mobile unit when the mobile unit is located in an environment that is substantially closed off to high radio frequency communication between the base station and the mobile unit, comprising the steps of:
  using a second antenna to receive a high radio frequency signal from the mobile unit;
  linearly converting the received high radio frequency signal into a low frequency signal for radiating radio frequency power into the closed environment;
  radiating the low frequency signal from a first antenna;
  using cable transmission means to receive the low frequency signal within the closed environment;
  linearly converting the received low frequency signal into a base station high radio frequency signal; and
  outputting the base station high radio frequency signal to a base station,
  wherein the step of outputting the base station high radio frequency signal to a base station comprises transmitting the base station high frequency signal to the base station via an air-interface.

16. In a communication system including a base station and a mobile unit, both operating at a high radio frequency, a repeater system for providing a communications link between the base station and the mobile unit when the mobile unit is located in an environment that is substantially closed off to high radio frequency communication between the base station and the mobile unit, the repeater system comprising:
  a first linear two-way frequency converter including:
    a high frequency port for two-way coupling to a first signal that is compatible with the high radio frequency used by the communication system; and
    a low frequency port for two-way coupling to a low frequency signal having a frequency for radiating radio frequency power through the closed environment;
  a first antenna, coupled to the high frequency port of the first linear two-way frequency converter, for receiving and transmitting the first high radio frequency signal;
  cable transmission means connected to the low frequency port of the first linear two-way frequency converter, and located within the closed environment for distributing the low frequency signal within the closed environment;
  a second linear two-way frequency converter, located within the closed environment, including:
    a low frequency port physically connected to the cable transmission means for two-way coupling to the low frequency signal; and
    a high frequency port for two-way coupling to a second high radio frequency signal that is compatible with the high radio frequency used by the communication system; and a second antenna connected to the high frequency port of the second linear two-way frequency converter.

17. In a communication system including at least one base station and at least one mobile unit, both operating at a high radio frequency, a repeater system for providing a communications link between the base station and the mobile unit when the mobile unit is located in an environment that is substantially closed off to high radio frequency communication between the base station and the mobile unit, the repeater system comprising:

a first linear two-way frequency converter including:
  a high frequency port for two-way coupling to a signal having a frequency that is compatible with the high frequency signal used by the communication system; and
  a low frequency port for two-way coupling to a low frequency signal having a frequency for radiating radio frequency power through the closed environment;

first cable transmission means connected to the low frequency port of the first linear two-way frequency converter, and located within the closed environment for distributing the low frequency signal within the closed environment;

a second linear two-way frequency converter, located within the closed environment, including:
  a low frequency port connected to the cable transmission means for two-way coupling to a low frequency signal; and
  a high frequency port for two-way coupling to a signal that is compatible with the high radio frequency signal used by the communication system;

a first antenna connected to the high frequency port of the second linear two-way frequency converter, and disposed within the closed environment to serve a first cell in the communication system;

a third linear two-way frequency converter including:
  a high frequency port for two-way coupling to a signal having a frequency that is compatible with the high frequency signal used by the communication system; and
  a low frequency port for two-way coupling to a low frequency signal having a frequency for radiating radio frequency power through the closed environment;

second cable transmission means connected to the low frequency port of the third linear two-way frequency converter, and located within the closed environment for distributing the low frequency signal within the closed environment;

a fourth linear two-way frequency converter, located within the closed environment, including;
  a low frequency port connected to the second cable transmission means for two-way coupling to a low frequency signal; and
  a high frequency port for two-way coupling to a signal that is compatible with the high radio frequency signal used by the communication system; and a second antenna connected to the high frequency port of the fourth linear two-way frequency converter and disposed within the closed environment to serve a second cell, wherein the second antenna is disposed within the enclosed environment at a location which causes a portion of the second cell to overlap a portion of the first cell, whereby a handoff of service between first and second base stations serving, respectively, the first and second cells can be effected when a mobile unit moves between the first and second cells.

* * * * *